US012640122B1

(12) United States Patent
Shir

(10) Patent No.: US 12,640,122 B1

(45) Date of Patent: May 26, 2026

(54) BOWED STRING INSTRUMENT WITH IMPROVED NECK

(71) Applicant: Gregory Shir, Hawthorne, CA (US)

(72) Inventor: Gregory Shir, Hawthorne, CA (US)

( * ) Notice: Subject to any disclaimer, the term of this patent is extended or adjusted under 35 U.S.C. 154(b) by 0 days.

(21) Appl. No.: 19/353,289

(22) Filed: Oct. 8, 2025

(51) Int. Cl.
*G10D 3/18* (2020.01)
*G10D 1/02* (2006.01)
*G10D 3/06* (2020.01)

(52) U.S. Cl.
CPC ................. *G10D 3/18* (2013.01); *G10D 1/02* (2013.01); *G10D 3/06* (2013.01)

(58) Field of Classification Search
CPC ............... G10D 3/18; G10D 1/02; G10D 3/06
USPC ............................................................ 84/328
See application file for complete search history.

(56) References Cited

U.S. PATENT DOCUMENTS 1,888,140 A * 11/1932 Novotny .................. G10D 3/06 984/115

* cited by examiner

*Primary Examiner* — Jianchun Qin
(74) *Attorney, Agent, or Firm* — Master Key IP, LLP; Justin G. Sanders

(57) ABSTRACT

A bowed string instrument having an improved neck is disclosed and configured for increasing consistency and ease of playability. In at least one embodiment, the instrument provides a body and an elongate neck extending from a top plate of the body, on which is supported an elongate fingerboard. A distal end of the neck provides a pegbox. A bottom surface of a proximal end of the pegbox provides an ergonomic, symmetrically tapered, lateral bulge configured for contacting and substantially conforming to a purlicue of a fingering hand of a musician, a chin positioned between a nut and a distal end of the pegbox, and a pegbox chamfer extending between the chin and a bottom surface of the neck, the pegbox chamfer configured for providing leverage for a thumb and forefinger of the fingering hand to reach positions along the neck and fingerboard by pressing and rotating against the pegbox chamfer.

18 Claims, 6 Drawing Sheets

BOWED STRING INSTRUMENT WITH IMPROVED NECK

RELATED APPLICATIONS

Not applicable.

BACKGROUND

The subject of this patent application relates generally to bowed string instruments, and more particularly to bowed string musical instruments having an improved neck configured for increasing consistency and ease of playability.

Applicant hereby incorporates herein by reference any and all patents and published patent applications cited or referred to in this application.

By way of background, since the 1550's, the classical acoustic violin (hereinafter referred to as the "violin" for simplicity purposes) has not had many, if any, utilitarian changes to its shape, size or design. As illustrated in FIGS. 1 and 2, the design and construction of the violin 200 is based on proportions and sizes that are deemed "sacred" and are reproduced verbatim with no intentional modifications outside of very minor differences in tolerances (i.e., 1-2 millimeters) from luthier to luthier. Some luthiers have been known to make purely aesthetic modifications to the scroll 202—e.g., from common rolled-up spirals to carved heads of various animals—for decorative purposes, but none are known to modify any portion of the violin 200 to have any utilitarian effects on its playability.

The violin 200 is commonly referred to as the most difficult instrument to learn how to play for a number of reasons. For example, and with continued reference to FIGS. 1 and 2 along with FIG. 3, the location at which a chin 204 of a pegbox 206 of the violin 200 terminates relative to a nut 208 of the violin 200 can be positioned too far forward for some violinists, which can make playing half positions very difficult where violinists are forced to contort their hand 300 and fingers because the chin 204 impedes on the ability to shift the hand 300 back enough for a comfortable (i.e., non-contorted) reach to play in the half positions. Additionally, a bottom 210 of the pegbox 206 can be too narrow for some violinists which, in turn, fails to provide (a) adequate widthwise support (so as to fit comfortably between the violinist's thumb 302 and forefinger 304) or even tactile response for the purlicue of the violinist's hand 300 (i.e., the space between the violinist's thumb 302 and forefinger 304 when they are extended) to rest in first position (also referred to as "home base"), (b) leverage for the violinist's thumb 302 to stretch the hand 300 and reach notes on a fingerboard 212 of the violin 200 with the other fingers, and (c) a tactile response for the violinist to find the first position. In other words, for such violinists, the fingering hand 300 is floating in space between the pegbox 206 and a body 214 of the violin 200.

Many violin teachers offer various methods to try and improve a student's expertise—but none of those solutions have sought to physically alter the violin 200 itself. For example, one such method involves placing adhesive dots or strips along the fingerboard 212 to assist the student in finding proper hand 300 and fingering positions, given that prior art violins 200 provide no physical elements or features (contrary to the frets on a guitar) that assist with identifying any of the proper hand 300 positions, including the first position closest to the scroll 202. As another example, restraints may be added to help the violinist maintain the bow in a position perpendicular to strings 216 of the violin 200 and centered between a bridge 218 and the end of the fingerboard 212. There are many others examples of such prior art solutions; however, these modifications and other similar physical elements are temporary, additive, and removable, and do not physical alter the violin 200 in a permanent way. Their intent is to teach the violinist some physical modification to their technique, and after which the temporary aids are removed. Each of these elements strive to provide the violinist some guidance, or barriers, or restraint, or tactile response for faster learning and ease of play. However, it is not known for any musician or luthier to physically alter the violin 200 in any way to achieve expertise or add tactile elements.

To better understand the impact of the present invention, it is also important to understand a few items relating to the traditional use of the violin 200. First, it is critical to understand proper finger and hand 300 positions. In the resting position, a neck 220 of the violin 200 rests in the violinist's purlicue. The bottom surface 210 of the pegbox 206 has a carved spine that terminates typically in a sharp convex corner or with a very slight eased edge. The typical fingering hand 300 grasp of the fingerboard 212 does not engage or touch the termination of any part of the pegbox 206, such that the violinist must know where the first position is by memory or feel of how the neck 220 of the violin 200 feels in the purlicue 306 of the fingering hand 300. This subtle hand 300 position typically takes years to master, as it is purely based on memory and feel. The infinite locations along the length of the fingerboard 212 and the strings 216 makes playing the violin 200 in perfect tune infinitely difficult. In other words, unlike the frets of a guitar, traditional violins 200 provide no physical identifying elements that define where the grasp should be or where any of the proper hand 300 positions are located. Some violinists temporarily push their hand 300 all the way back to feel the end of the pegbox 206 along the back of their thumb 302 and purlicue 306 by making physical contact with the chin 204 of the pegbox 206 then relocate their hand 300 further away disengaging with the chin 204 a mere miniscule muscle memory away. This makes learning to play extremely challenging and takes years to master.

Second, and relatedly, the violinist's fingering hand 300 does not remain in one position on the fingerboard 212, but instead must quickly jump from position to position along the fingerboard 212—up closer to the bridge 218 and back, sometimes having to jump from any higher position back to lower positions and back to higher positions in a matter of a fraction of a second, and these hand 300 locations are only known via muscle memory with no physical element defining these positions—making mastering the violin 200 extremely challenging.

Third, the inside side of the thumb 302 (i.e., the side of the thumb 302 that faces the forefinger 304) is very commonly used for leverage and reach by pressing the side of the thumb 302 against the neck 220 of the violin 200 and pulling the remaining fingers up and away to extend and reach proper hand 300 and finger positioning—in particular, on the G string 216 (i.e., the string 216 closest to the thumb 302). Often, the fingering hand 300 rotates clockwise along the neck 220 and uses the thumb 302 to give the remaining fingers even more reach.

Finally, the opposite end of the neck 220 (i.e., opposite from the pegbox 206) is connected to the body 214 of the violin 200 via a curved heel 222. In the higher positions, the violinist uses the tactile feel of the heel 222 by wrapping the thumb 302 tight (sometimes rotated as well) against a heel chamfer 256 of the heel 222 to help bend and extend the remaining fingers to reach the higher positions on the fingerboard 212; but no such physical element exists near the pegbox 206 for the lower positions to allow the hand 300 to physically leverage for reach and find the proper positioning.

Thus, there remains a need for a violin (along with other types of bowed string instruments) having an improved neck configured for increasing consistency and ease of playability. Aspects of the present invention fulfill these needs and provide further related advantages as described in the following summary.

It should be noted that the above background description includes information that may be useful in understanding aspects of the present invention. It is not an admission that any of the information provided herein is prior art or relevant to the presently claimed invention, or that any publication specifically or implicitly referenced is prior art.

SUMMARY

Aspects of the present invention teach certain benefits in construction and use which give rise to the exemplary advantages described below.

The present invention solves the problems described above by providing a bowed string instrument having an improved neck configured for increasing consistency and ease of playability. In at least one embodiment, the instrument provides a body having a top plate on a top surface thereof, and an elongate neck extending from the top plate of the body, on which is supported an elongate fingerboard. A proximal end of the neck is connected to the body via a heel which provides a substantially quarter-circular concave-shaped heel chamfer serving as a transition surface between the proximal end of the neck and the body. An opposing distal end of the neck provides a pegbox supporting a plurality of tuning pegs configured for adjusting a tension of a plurality of strings, the strings extending from the tuning pegs, across a top surface of the fingerboard, over a bridge positioned on the top plate of the body, to a tailpiece also positioned on the top plate of the body. The distal end of the neck further provides a nut positioned proximal to the pegbox and configured for guiding the strings into the pegbox. A bottom surface of a proximal end of the pegbox provides an ergonomic, symmetrically tapered, lateral bulge configured for contacting and substantially conforming to a purlicue of a fingering hand of a musician when the fingering hand is in a first position relative to the neck. The bottom surface of the proximal end of the pegbox further provides a chin positioned between the nut and a distal end of the pegbox. The bottom surface of the proximal end of the pegbox further provides a pegbox chamfer extending between the chin and a bottom surface of the neck as a transition surface therebetween, the pegbox chamfer configured for providing leverage for a thumb and a forefinger of the fingering hand to reach positions along the neck and fingerboard by pressing and rotating against the pegbox chamfer.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

DETAILED DESCRIPTION

Figure 4A:
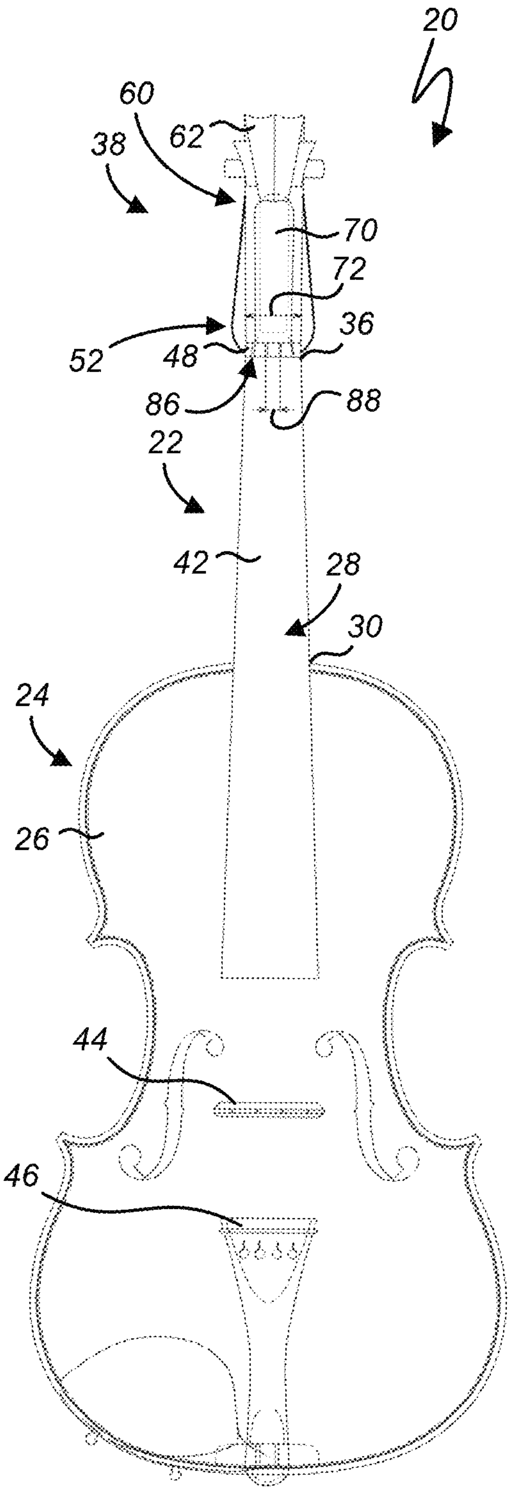
FIG. 4A is a top plan view of an exemplary bowed string instrument having an improved neck, in accordance with at least one embodiment, with the strings omitted for clarity purposes.
Figure 5A:
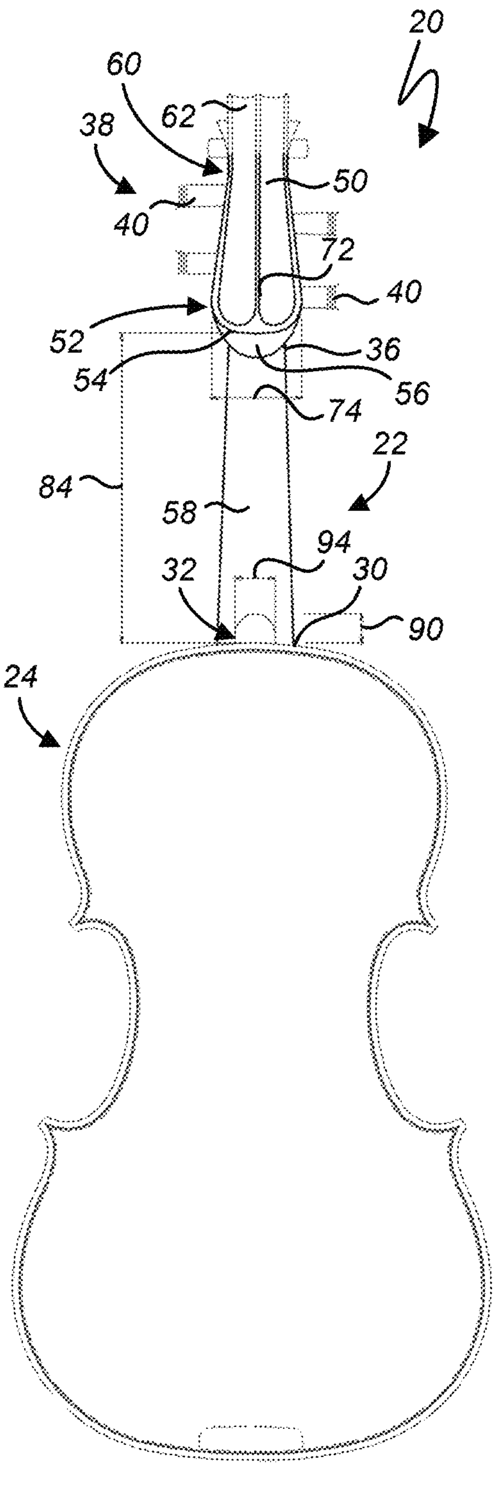
FIG. 5A is a bottom plan view of the exemplary bowed string instrument of FIG. 4A.
Figure 6A:
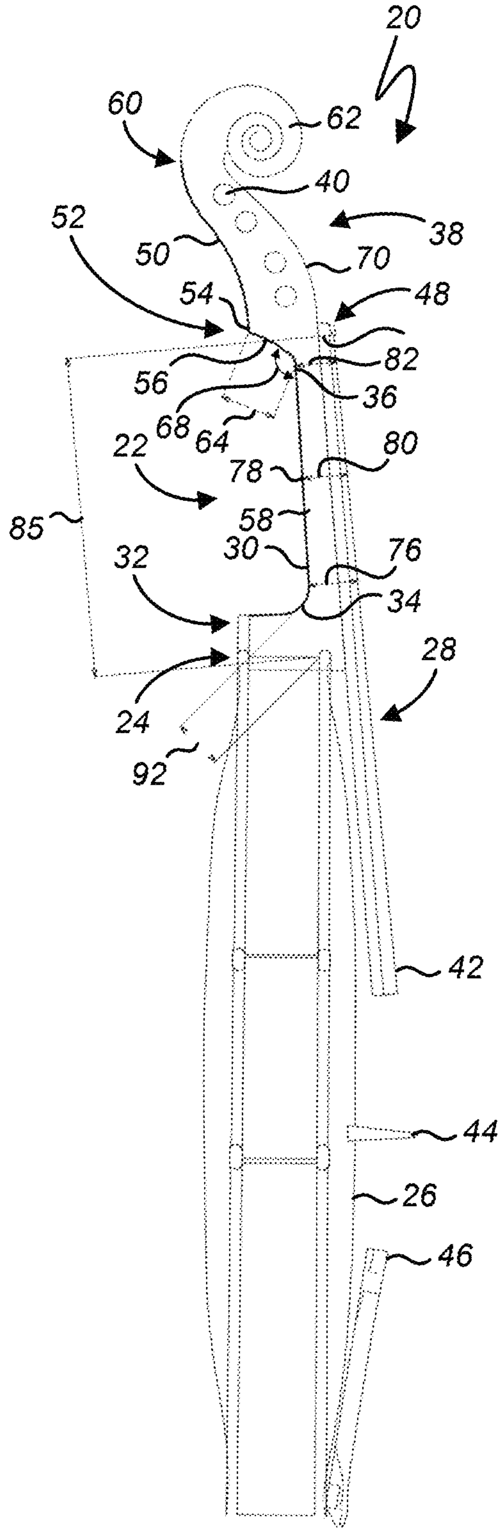
FIG. 6A is a side elevational view of the exemplary bowed string instrument of FIG. 4A.

Turning now to FIGS. 4A, 5A and 6A, there is shown an exemplary bowed string instrument 20 having an improved neck 22. In that regard, it should be noted that while the exemplary instrument 20 shown and described herein is a violin, in further embodiments, the instrument 20 may be configured as any type of bowed string instrument now known or later developed—including but not limited to a violin, a viola, a cello, a double bass, etc. —so long as the instrument 20 is capable of substantially carrying out the functionality described herein. In at least one embodiment, the instrument 20 provides a main body 24, and an elongate neck 22 extending from a top plate 26 of the body 24, on which is supported a fingerboard 28. A proximal end 30 of the neck 22 is connected to the body 24 via a heel 32 which provides a substantially quarter-circular concave-shaped heel chamfer 34 serving as a transition surface between the proximal end 30 of the neck 22 and the body 24. A distal end 36 of the neck 22 provides a pegbox 38, which supports a plurality of tuning pegs 40 (omitted in some figures for clarity) configured for adjusting the tension of a plurality of strings (also omitted for clarity) of the instrument 20, the strings extending from the tuning pegs 40, across a top surface 42 of the fingerboard 28, over a bridge 44 positioned on the top plate 26 of the body 24, to a tailpiece 46 also positioned on the top plate 26 of the body 24. The distal end 36 of the neck 22 further provides a nut 48 positioned proximal to the pegbox 38 and configured for guiding the strings into the pegbox 38. In at least one embodiment, a bottom surface 50 of a proximal end 52 of the pegbox 38 provides a chin 54, with a pegbox chamfer 56 extending between the chin 54 and a bottom surface 58 of the neck 22 as a transition surface therebetween. In at least one embodiment, a distal end 60 of the pegbox 38 provides a decorative scroll 62.

Figure 1:
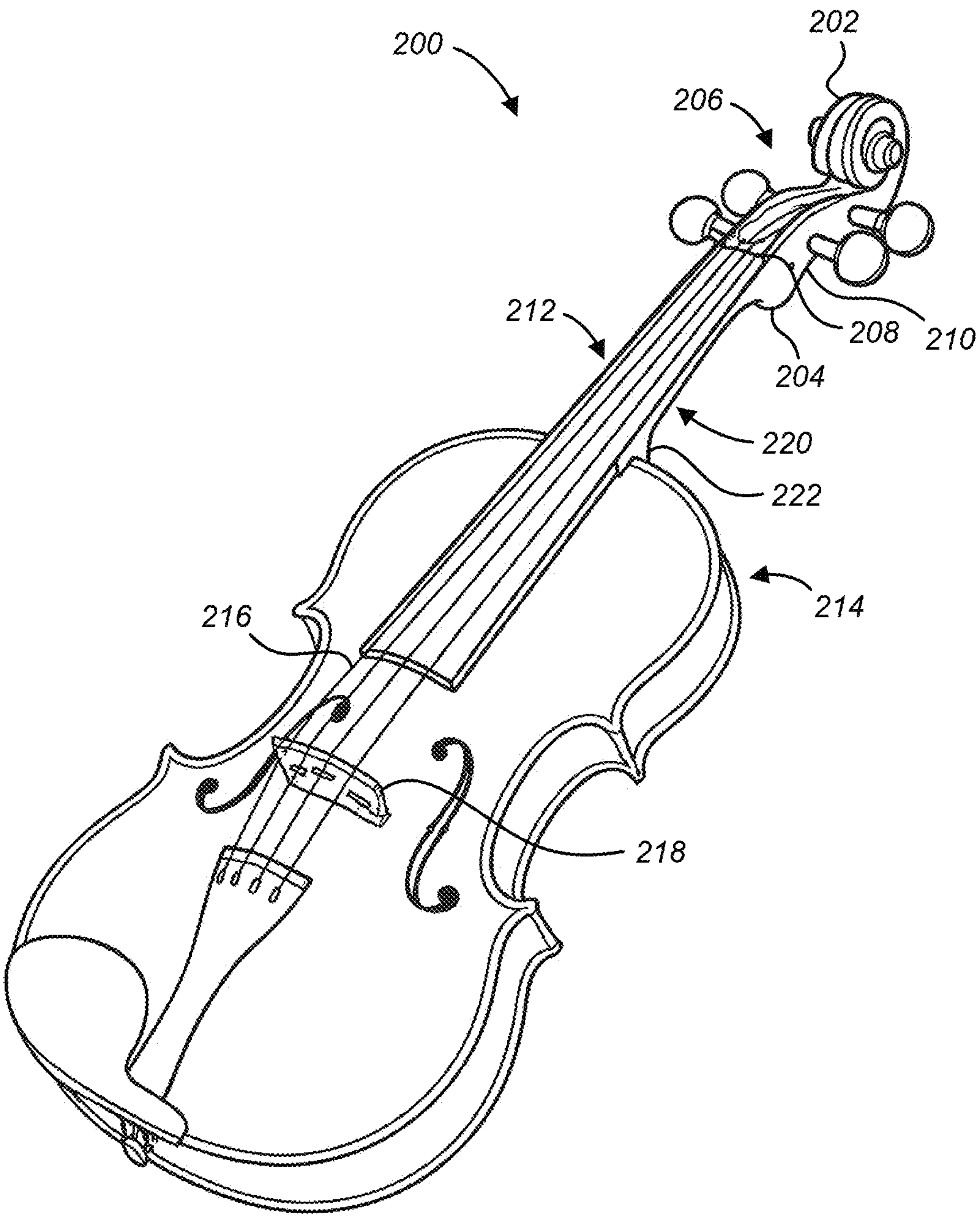
Fig. 1 (prior art)
FIG. 1 is a perspective view of an exemplary prior art violin.
Figure 2:
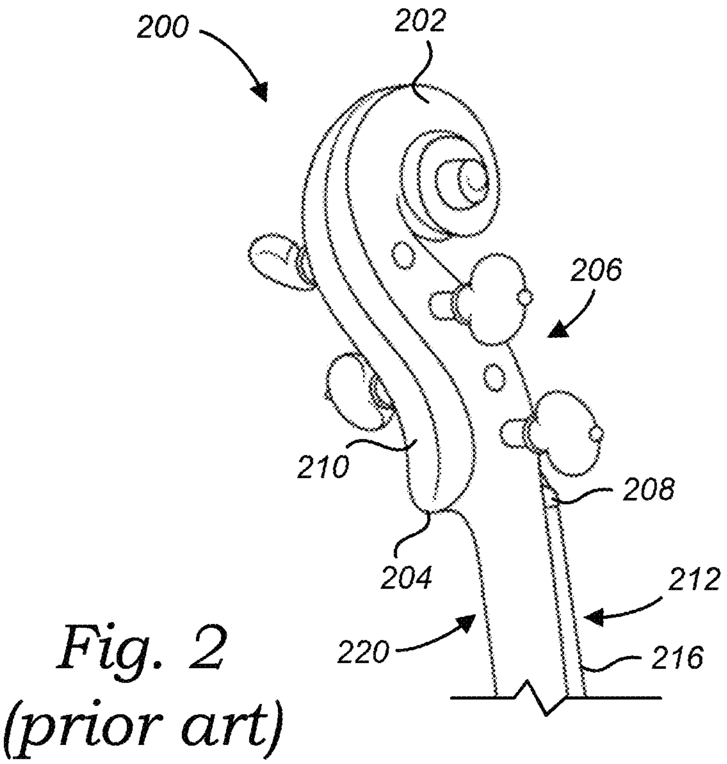
Fig. 2 (prior art)
FIG. 2 is a further partial perspective view thereof.
Figure 3:
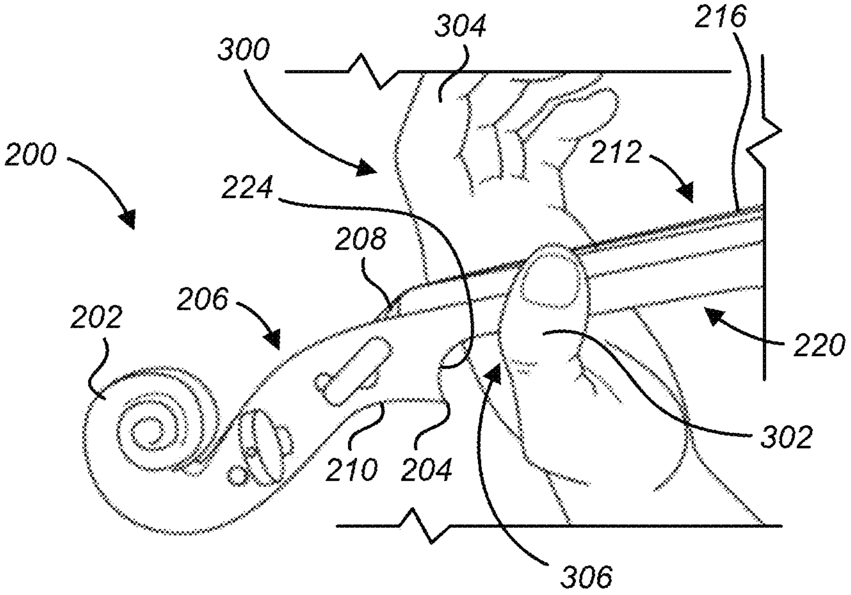
Fig. 3 (prior art)
FIG. 3 is a partial perspective view of an exemplary prior art violin as held by an exemplary fingering hand of a violinist in first position.

In at least one embodiment, the chin 54 of the pegbox 38 is positioned relatively further from the nut 48, and relatively closer to the distal end 60 of the pegbox 38, as compared to the location of the prior art chin 204 of prior art instruments 200. This, in turn, assists the fingering hand 300 of the musician in reaching half positions on the fingerboard 28 more easily. In a bit more detail, as illustrated best in FIG. 6B, the prior art chin 204 of prior art instruments 200 is typically located directly below (i.e., in the same plane as) a proximal end 226 of the prior art nut 208, given that a prior art pegbox chamfer 224 of prior art instruments 200 has a prior art pegbox chamfer length 230 of approximately 18.1 millimeters. By comparison, as illustrated best in FIG. 6A, the pegbox chamfer 56 of the instrument 20 has a pegbox chamfer length 64 of approximately 23 millimeters, such that the chin 54 of the pegbox 38 is positioned a chin setback distance 66 (FIG. 7) of approximately 4 millimeters closer to the distal end 60 of the pegbox 38 as compared to the prior art chin 204. Additionally, as illustrated best in FIGS. 6A and 6B, the pegbox chamfer 56 has a pegbox chamfer angle 68, relative to the bottom surface 58 of the neck 22, that is relatively greater than a prior art pegbox chamfer angle 232 of the prior art pegbox chamfer 224. In a bit more detail, the prior art pegbox chamfer angle 232 of the prior art pegbox chamfer 224 is typically approximately 90 degrees relative to a bottom surface 234 of the prior art neck 220, while also having a substantially quarter-circular concave shape. As noted above, and illustrated in FIG. 3, this shape and configuration of the prior art pegbox chamfer 224 creates a gap between the fingering hand 300 and the prior art pegbox chamfer 224 when the fingering hand 300 is in first position, such that the prior art pegbox chamfer 224 provides no tactile guide for the fingering hand 300 to quickly or easily locate first position—instead, musicians are simply forced to try and memorize first position based on repetition and muscle memory alone. By comparison, the pegbox chamfer 56 has a pegbox chamfer angle 68 of approximately 125 degrees relative to the bottom surface 58 of the neck 22, while also having a shape that is more planar than curved, which creates a tactile guide/stop for the fingering hand 300 to quickly and easily locate first position. Additionally, the pegbox chamfer 56 is capable of providing leverage for the thumb 302 and forefinger 304 of the fingering hand 300 to reach notes in lower and upper positions more easily by pressing and rotating against the pegbox chamfer 56.

Figure 7:
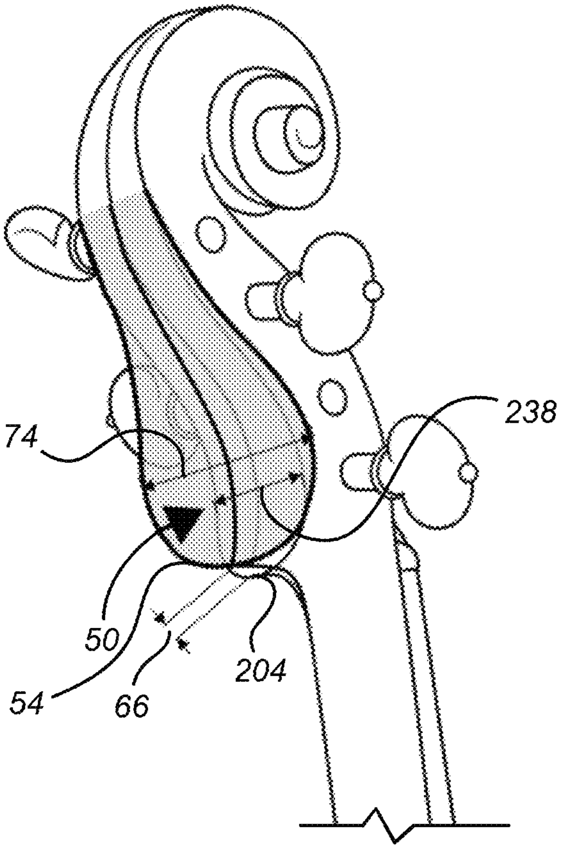
FIG. 7 is a partial diagrammatic perspective view of a pegbox and chin of the exemplary bowed string instrument of FIG. 4A as overlaid onto a pegbox and chin of the exemplary prior art violin of FIG. 4B for comparison purposes.

In at least one embodiment, as best illustrated in FIGS. 4A, 5A and 7, the bottom surface 50 of the proximal end 52 of the pegbox 38 is sized and shaped as a tapered, symmetrical lateral bulge configured for creating an ergonomic, tactile guide/stop for contacting and substantially conforming to the purlicue 306 of the fingering hand 300 when the fingering hand 300 is in first position, while also providing leverage for the thumb 302 and forefinger 304 of the fingering hand 300 to reach notes in lower and upper positions more easily by pressing and rotating against the pegbox chamfer 56. In at least one such embodiment, the proximal end 52 of the pegbox 38 is widest at the bottom surface 50 of the proximal end 52 of the pegbox 38, and tapers toward each of an opposing top surface 70 and the distal end 60 of the pegbox 38. In at least one such embodiment, the top surface 70 of the pegbox 38 has a pegbox width 72 of approximately 25 millimeters (as compared to a prior art pegbox width 236 of approximately 23.8 millimeters for the prior art pegbox 206), while the bottom surface 50 of the proximal end 52 of the pegbox 38, along with the chin 54, has a chin width 74 of approximately 33 millimeters (as compared to a prior art chin width 238 of approximately 23.6 millimeters for the prior art chin 204). It should be noted that, in further embodiments, the specific size, shape and dimensions of the tapered, symmetrical lateral bulge of the bottom surface 50 of the proximal end 52 of the pegbox 38 may vary slightly in order to accommodate different fingering hand 300 sizes.

It at least one embodiment, the tapered, symmetrical lateral bulge of the bottom surface 50 of the proximal end 52 of the pegbox 38 is integral with, and carved or molded from the same piece of material as, the rest of the pegbox 38. However, in at least one alternate embodiment, the symmetrical lateral bulge of the bottom surface 50 of the proximal end 52 of the pegbox 38 is instead a separate piece that is engageable—either removably or permanently—with the bottom surface 50 of the proximal end 52 of the pegbox 38. In at least one such alternate embodiment, the symmetrical lateral bulge of the bottom surface 50 of the proximal end 52 of the pegbox 38 is capable of being engaged with the bottom surface 210 of the prior art pegbox 206, thereby providing the same above-described benefits to prior art and other existing bowed string instrument 200 as an after-market component.

Figure 5B:
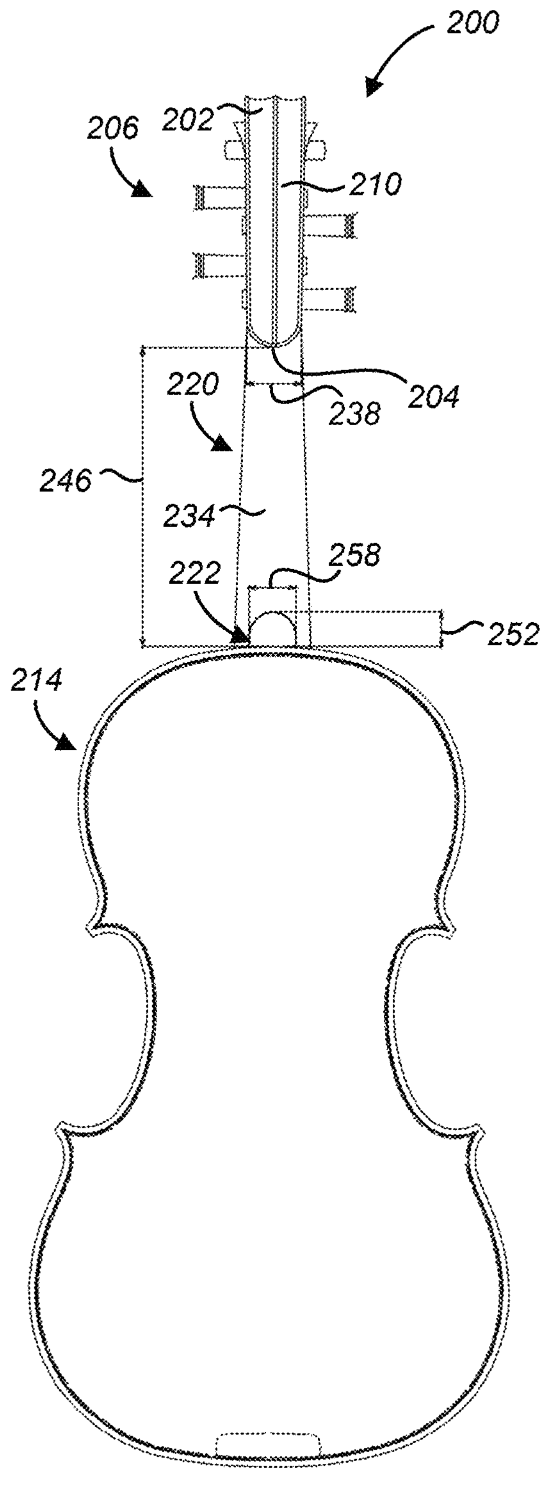
Fig. 5B (prior art)
FIG. 5B is a bottom plan view of the exemplary prior art violin of FIG. 4B for comparison purposes.
Figure 6B:
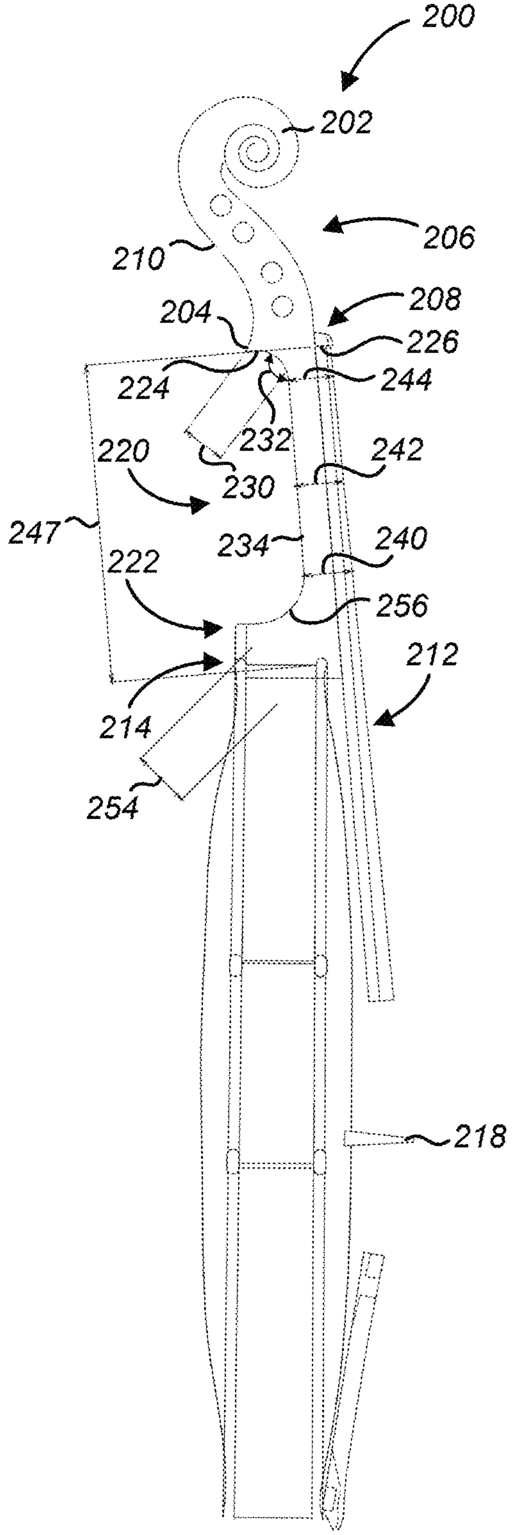
Fig. 6B (prior art)
FIG. 6B is a side elevational view of the exemplary prior art violin of FIG. 4B for comparison purposes.

In at least one embodiment, several other components of the instrument 20 provide modified dimensions as well, in order to further increase consistency and ease of playability of the instrument 20. In at least one embodiment, the neck 22 has an increased neck thickness, as measured from the bottom surface 58 of the neck 22 to the top surface 42 of the fingerboard 28. In at least one such embodiment, as best illustrated in FIG. 6A, the proximal end 30 of the neck 22 has a proximal neck thickness 76 of approximately 20 millimeters (as compared to a prior art proximal neck thickness 240 of approximately 19.9 millimeters for prior art instruments 200, as illustrated in FIG. 6B), a midpoint 78 of the neck 22 has a midpoint neck thickness 80 of approximately 18 millimeters (as compared to a prior art midpoint neck thickness 242 of approximately 19 millimeters for prior art instruments 200, as illustrated in FIG. 6B), and the distal end 36 of the neck 22 has a distal neck thickness 82 of approximately 17 millimeters (as compared to a prior art distal neck thickness 244 of approximately 18.5 millimeters for prior art instruments 200, as illustrated in FIG. 6B). Additionally, in at least one embodiment, as best illustrated in FIG. 5A, the neck 22 of the instrument 20 has a neck length 84 (measured as a distance between the chin 54 of the pegbox 38 and the body 24) of approximately 130 millimeters (as compared to a prior art neck length 246 of approximately 128.9 millimeters for prior art instruments 200, as illustrated in FIG. 5B). In at least one embodiment, as best illustrated in FIG. 6A, the portion of the fingerboard 28 positioned on the neck 22 has a fingerboard length 85 (measured as a distance between the nut 48 and a purling of the body 24) of approximately 132.5 millimeters (as compared to a prior art fingerboard length 247 of approximately 131.2 millimeters for prior art instruments 200, as illustrated in FIG. 6B).

Figure 4B:
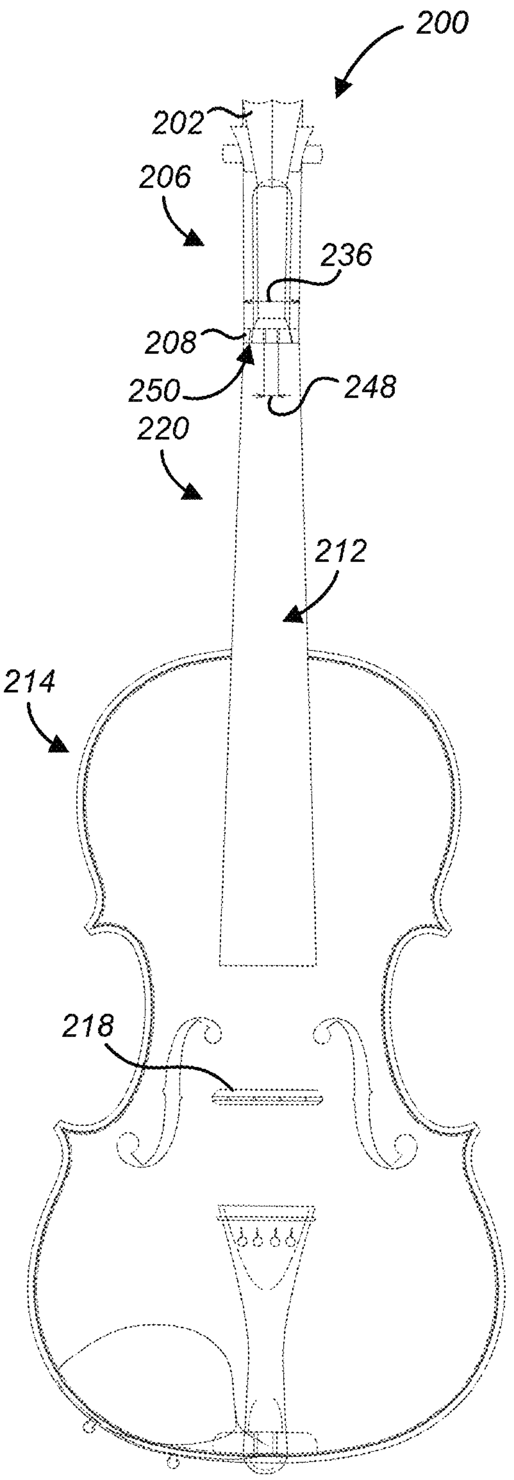
Fig. 4B (prior art)
FIG. 4B is a top plan view of an exemplary prior art violin for comparison purposes, with the strings omitted for clarity purposes.

In at least one embodiment, as best illustrated in FIG. 4A, the nut 48 provides a plurality of laterally spaced apart string grooves 86, with each string groove 86 positioned and configured for receiving and guiding one of the strings into the pegbox 38. In at least one such embodiment, the string grooves 86 have a lateral groove space 88 of approximately 5 millimeters (as compared to a prior art groove space 248 of approximately 6.1 millimeters for prior art string grooves 250 of prior art instruments 200, as illustrated in FIG. 4B).

In at least one embodiment, the heel 32 of the instrument 20 has a relatively longer heel length 90 so as to be positioned relatively further from the body 24 of the instrument 20, as compared to a prior art heel length 252 of the prior art heel 222 of prior art instruments 200, while the heel chamfer 34 has a heel chamfer depth 92, as measured between the heel chamfer 34 and the body 24, that is relatively closer to the body 24 of the instrument 20, as compared to a prior art heel chamfer depth 254 of a prior art heel chamfer 256 of prior art instruments 200, which allows the thumb 302 of the fingering hand 300 to be positioned relatively closer to the body 24 of the instrument 20, making it relatively easier for the fingering hand 300 to reach the higher positions on the fingerboard 28. In at least one such embodiment, as best illustrated in FIGS. 5A and 6A, the heel 32 has a heel length 90 of approximately 10 millimeters (as compared to a prior art heel length 252 of approximately 12.6 millimeters for the prior art heel 222 of prior art instruments 200, as illustrated in FIG. 5B), while the heel chamfer 34 has a heel chamfer depth 92 of approximately 20 millimeters (as compared to a prior art heel chamfer depth 254 of approximately 23.8 millimeters, as illustrated in FIG. 6B). Additionally, in at least one embodiment, the heel 32 of the instrument 20 has a heel width 94 that is relatively wider as compared to a prior art heel width 258 of the prior art heel 222 of prior art instruments 200, which provides better leverage for the thumb 302 of the fingering hand 300 to tightly wrap against, and sometimes rotate relative to, the heel 32 to assist with bending and extending the remaining fingers of the fingering hand 300 to reach the higher positions on the fingerboard 28. In at least one such embodiment, as best illustrated in FIG. 5A, the heel 32 has a heel width 94 of approximately 20 millimeters (as compared to a prior art heel width 258 of approximately 17.3 millimeters for the prior art heel 222 of prior art instruments 200, as illustrated in FIG. 5B).

Accordingly, again, in at least one embodiment, the improved neck 22 of the instrument 20 assists in increasing consistency and ease of playability of the instrument 20 for both beginners and experts alike.

Aspects of the present specification may also be described as the following embodiments:

1. A bowed string instrument comprising: a body providing a top plate on a top surface thereof; an elongate neck extending from the top plate of the body, on which is supported an elongate fingerboard; a proximal end of the neck connected to the body via a heel which provides a substantially quarter-circular concave-shaped heel chamfer serving as a transition surface between the proximal end of the neck and the body; an opposing distal end of the neck providing a pegbox supporting a plurality of tuning pegs configured for adjusting a tension of a plurality of strings, the strings extending from the tuning pegs, across a top surface of the fingerboard, over a bridge positioned on the top plate of the body, to a tailpiece also positioned on the top plate of the body; the distal end of the neck further providing a nut positioned proximal to the pegbox and configured for guiding the strings into the pegbox; a bottom surface of a proximal end of the pegbox providing an ergonomic, symmetrically tapered, lateral bulge configured for contacting and substantially conforming to a purlicue of a fingering hand of a musician when the fingering hand is in a first position relative to the neck; the bottom surface of the proximal end of the pegbox further providing a chin positioned between the nut and a distal end of the pegbox; and the bottom surface of the proximal end of the pegbox further providing a pegbox chamfer extending between the chin and a bottom surface of the neck as a transition surface therebetween, the pegbox chamfer configured for providing leverage for a thumb and a forefinger of the fingering hand to reach positions along the neck and fingerboard by pressing and rotating against the pegbox chamfer.

2. The bowed string instrument according to embodiment 1, wherein the distal end of the pegbox provides a decorative scroll.

3. The bowed string instrument according to embodiments 1-2, wherein the pegbox chamfer has a pegbox chamfer length of approximately 22.5 millimeters.

4. The bowed string instrument according to embodiments 1-3, wherein the chin of the pegbox is positioned a chin setback distance of approximately 4 millimeters toward the distal end of the pegbox, as measured from the nut.

5. The bowed string instrument according to embodiments 1-4, wherein the pegbox chamfer has a pegbox chamfer angle of approximately 125 degrees relative to the bottom surface of the neck.

6. The bowed string instrument according to embodiments 1-5, wherein the pegbox chamfer is substantially planar so as to create a physical stop for contacting the fingering hand of the musician when the fingering hand is in the first position relative to the neck.

7. The bowed string instrument according to embodiments 1-6, wherein the proximal end of the pegbox is widest at the bottom surface of the proximal end of the pegbox, and tapers toward each of a top surface of the pegbox and the distal end of the pegbox.

8. The bowed string instrument according to embodiments 1-7, wherein: the top surface of the pegbox has a pegbox width of approximately 25 millimeters; and the bottom surface of the proximal end of the pegbox, along with the chin, has a chin width of approximately 35 millimeters.

9. The bowed string instrument according to embodiments 1-8, wherein the ergonomic, symmetrically tapered, lateral bulge and chin are integral with the pegbox.

10. The bowed string instrument according to embodiments 1-9, wherein the ergonomic, symmetrically tapered, lateral bulge and chin are engageable with a bottom surface of the pegbox.

11. The bowed string instrument according to embodiments 1-10, wherein: the proximal end of the neck has a proximal neck thickness of approximately 20 millimeters; a midpoint of the neck has a midpoint neck thickness of approximately 18 millimeters; and the distal end of the neck has a distal neck thickness of approximately 17 millimeters.

12. The bowed string instrument according to embodiments 1-11, wherein the neck has a neck length of approximately 132.5 millimeters.

13. The bowed string instrument according to embodiments 1-12, wherein the nut provides a plurality of laterally spaced apart string grooves, with each string groove positioned and configured for receiving and guiding one of the strings into the pegbox.

14. The bowed string instrument according to embodiments 1-13, wherein the string grooves have a lateral groove space of approximately 5 millimeters.

15. The bowed string instrument according to embodiments 1-14, wherein the heel is configured for allowing the thumb of the fingering hand to be positioned relatively closer to the body of the instrument, thereby assisting the fingering hand in reaching higher positions on the neck and fingerboard.

16. The bowed string instrument according to embodiments 1-15, wherein: the heel has a heel length of approximately 15 millimeters; and the heel chamfer has a heel chamfer depth, as measured between the heel chamfer and the body, of approximately 20 millimeters.

17. The bowed string instrument according to embodiments 1-16, wherein the heel is further configured for providing leverage for the thumb of the fingering hand to reach higher positions on the neck and fingerboard.

18. The bowed string instrument according to embodiments 1-17, wherein the heel has a heel width of approximately 20 millimeters.

19. A bowed string instrument comprising: a body providing a top plate on a top surface thereof; an elongate neck extending from the top plate of the body, on which is supported an elongate fingerboard; a proximal end of the neck connected to the body via a heel which provides a substantially quarter-circular concave-shaped heel chamfer serving as a transition surface between the proximal end of the neck and the body; an opposing distal end of the neck providing a pegbox supporting a plurality of tuning pegs configured for adjusting a tension of a plurality of strings, the strings extending from the tuning pegs, across a top surface of the fingerboard, over a bridge positioned on the top plate of the body, to a tailpiece also positioned on the top plate of the body; the distal end of the neck further providing a nut positioned proximal to the pegbox and configured for guiding the strings into the pegbox; a bottom surface of a proximal end of the pegbox providing an ergonomic, symmetrically tapered, lateral bulge configured for contacting and substantially conforming to a purlicue of a fingering hand of a musician when the fingering hand is in a first position relative to the neck; the bottom surface of the proximal end of the pegbox further providing a chin positioned a chin setback distance of approximately 4 millimeters toward a distal end of the pegbox, as measured from the nut; the bottom surface of the proximal end of the pegbox further providing a pegbox chamfer extending between the chin and a bottom surface of the neck as a transition surface therebetween, the pegbox chamfer having a pegbox chamfer length of approximately 22.5 millimeters and a pegbox chamfer angle of approximately 125 degrees relative to the bottom surface of the neck, for providing leverage for a thumb and a forefinger of the fingering hand to reach positions along the neck and fingerboard by pressing and rotating against the pegbox chamfer; a top surface of the pegbox having a pegbox width of approximately 25 millimeters; and the bottom surface of the proximal end of the pegbox, along with the chin, having a chin width of approximately 35 millimeters.

20. A bowed string instrument comprising: a body providing a top plate on a top surface thereof; an elongate neck extending from the top plate of the body, on which is supported an elongate fingerboard; a proximal end of the neck connected to the body via a heel which provides a substantially quarter-circular concave-shaped heel chamfer serving as a transition surface between the proximal end of the neck and the body; an opposing distal end of the neck providing a pegbox supporting a plurality of tuning pegs configured for adjusting a tension of a plurality of strings, the strings extending from the tuning pegs, across a top surface of the fingerboard, over a bridge positioned on the top plate of the body, to a tailpiece also positioned on the top plate of the body; the distal end of the neck further providing a nut positioned proximal to the pegbox and configured for guiding the strings into the pegbox; an ergonomic, symmetrically tapered, lateral bulge engageable with a bottom surface of a proximal end of the pegbox and configured for contacting and substantially conforming to a purlicue of a fingering hand of a musician when the fingering hand is in a first position relative to the neck; the ergonomic, symmetrically tapered, lateral bulge further providing a chin positioned a chin setback distance of approximately 4 millimeters toward a distal end of the pegbox, as measured from the nut; the ergonomic, symmetrically tapered, lateral bulge further providing a pegbox chamfer extending between the chin and a bottom surface of the neck as a transition surface therebetween, the pegbox chamfer having a pegbox chamfer length of approximately 22.5 millimeters and a pegbox chamfer angle of approximately 125 degrees relative to the bottom surface of the neck, for providing leverage for a thumb and a forefinger of the fingering hand to reach positions along the neck and fingerboard by pressing and rotating against the pegbox chamfer; a top surface of the pegbox having a pegbox width of approximately 25 millimeters; and the ergonomic, symmetrically tapered, lateral bulge, along with the chin, having a chin width of approximately 35 millimeters.

In closing, regarding the exemplary embodiments of the present invention as shown and described herein, it will be appreciated that a bowed string instrument having an improved neck is disclosed and configured for increasing consistency and ease of playability. Because the principles of the invention may be practiced in a number of configurations beyond those shown and described, it is to be understood that the invention is not in any way limited by the exemplary embodiments, but is generally directed to a bowed string instrument having an improved neck and is able to take numerous forms to do so without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the terms "about" and "approximately." As used herein, the terms "about" and "approximately" mean that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques. Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein. Similarly, as used herein, unless indicated to the contrary, the term "substantially" is a term of degree intended to indicate an approximation of the characteristic, item, quantity, parameter, property, or term so qualified, encompassing a range that can be understood and construed by those of ordinary skill in the art, or at least encompassing a range of plus or minus ten percent above and below the value of the stated characteristic, item, quantity, parameter, property, or term.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.—for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising" (along with equivalent open-ended transitional phrases thereof such as "including," "containing" and "having") encompasses all the expressly recited elements, limitations, steps and/or features alone or in combination with un-recited subject matter; the named elements, limitations and/or features are essential, but other unnamed elements, limitations and/or features may be added and still form a construct within the scope of the claim. Specific embodiments disclosed herein may be further limited in the claims using the closed-ended transitional phrases "consisting of" or "consisting essentially of" in lieu of or as an amendment for "comprising." When used in the claims, whether as filed or added per amendment, the closed-ended transitional phrase "consisting of" excludes any element, limitation, step, or feature not expressly recited in the claims. The closed-ended transitional phrase "consisting essentially of" limits the scope of a claim to the expressly recited elements, limitations, steps and/or features and any other elements, limitations, steps and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps and/or features specifically recited in the claim, whereas the meaning of the closed-ended transitional phrase "consisting essentially of" is being defined as only including those elements, limitations, steps and/or features specifically recited in the claim and those elements, limitations, steps and/or features that do not materially affect the basic and novel characteristic(s) of the claimed subject matter. Therefore, the open-ended transitional phrase "comprising" (along with equivalent open-ended transitional phrases thereof) includes within its meaning, as a limiting case, claimed subject matter specified by the closed-ended transitional phrases "consisting of" or "consisting essentially of." As such, embodiments described herein or so claimed with the phrase "comprising" are expressly or inherently unambiguously described, enabled and supported herein for the phrases "consisting essentially of" and "consisting of."

Any claims intended to be treated under 35 U.S.C. § 112(f) will begin with the words "means for," but use of the term "for" in any other context is not intended to invoke treatment under 35 U.S.C. § 112(f). Accordingly, Applicant reserves the right to pursue additional claims after filing this application, in either this application or in a continuing application.

It should be understood that any methods disclosed herein, along with the order in which the respective elements of any such method are performed, are purely exemplary. Depending on the implementation, they may be performed in any order or in parallel, unless indicated otherwise in the present disclosure.

All patents, patent publications, and other publications referenced and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents are based on the information available to the applicant and does not constitute any admission as to the correctness of the dates or contents of these documents.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

All of the material in this patent document issue subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

What is claimed is:

1. A bowed string instrument comprising:
- a body providing a top plate on a top surface thereof;
- an elongate neck extending from the top plate of the body, on which is supported an elongate fingerboard;
- a proximal end of the neck connected to the body via a heel which provides a quarter-circular concave-shaped heel chamfer serving as a transition surface between the proximal end of the neck and the body;
- an opposing distal end of the neck providing a pegbox supporting a plurality of tuning pegs configured for adjusting a tension of a plurality of strings, the strings extending from the tuning pegs, across a top surface of the fingerboard, over a bridge positioned on the top plate of the body, to a tailpiece also positioned on the top plate of the body;
- the distal end of the neck further providing a nut positioned proximal to the pegbox and configured for guiding the strings into the pegbox;
- a bottom surface of a proximal end of the pegbox providing an ergonomic, symmetrically tapered, lateral bulge configured for contacting and conforming to a purlicue of a fingering hand of a musician when the fingering hand is in a first position relative to the neck, so as to provide leverage for a thumb and a forefinger of the fingering hand to reach notes in lower and upper positions along the neck;
- the bottom surface of the proximal end of the pegbox further providing a chin positioned between the nut and a distal end of the pegbox; and
- the bottom surface of the proximal end of the pegbox further providing a planar pegbox chamfer extending between the chin and a bottom surface of the neck as a transition surface therebetween, the pegbox chamfer having a pegbox chamfer angle of approximately 125 degrees relative to the bottom surface of the neck, for providing leverage for the thumb and forefinger of the fingering hand to reach positions along the neck and fingerboard by pressing and rotating against the pegbox chamfer, while also creating a physical stop for contacting the fingering hand when the fingering hand is in the first position relative to the neck.

2. The bowed string instrument of claim 1, wherein the distal end of the pegbox provides a decorative scroll.

3. The bowed string instrument of claim 1, wherein the pegbox chamfer has a pegbox chamfer length of approximately 20 millimeters.

4. The bowed string instrument of claim 1, wherein the chin of the pegbox is positioned a chin setback distance of approximately 4 millimeters toward the distal end of the pegbox, as measured from the nut, for assisting the fingering hand of the musician in reaching half positions on the fingerboard.

5. The bowed string instrument of claim 1, wherein the proximal end of the pegbox is widest at the bottom surface of the proximal end of the pegbox, and tapers toward each of a top surface of the pegbox and the distal end of the pegbox.

6. The bowed string instrument of claim 5, wherein:
- the top surface of the pegbox has a pegbox width of approximately 25 millimeters; and
- the bottom surface of the proximal end of the pegbox, along with the chin, has a chin width of approximately 33 millimeters.

7. The bowed string instrument of claim 1, wherein the ergonomic, symmetrically tapered, lateral bulge and chin are integral with the pegbox.

8. The bowed string instrument of claim 1, wherein the ergonomic, symmetrically tapered, lateral bulge and chin are engageable with a bottom surface of the pegbox.

9. The bowed string instrument of claim 1, wherein:
- the proximal end of the neck has a proximal neck thickness of approximately 20 millimeters;
- a midpoint of the neck has a midpoint neck thickness of approximately 18 millimeters; and
- the distal end of the neck has a distal neck thickness of approximately 17 millimeters.

10. The bowed string instrument of claim 1, wherein the neck has a neck length of approximately 130 millimeters.

11. The bowed string instrument of claim 1, wherein the nut provides a plurality of laterally spaced apart string grooves, with each string groove positioned and configured for receiving and guiding one of the strings into the pegbox.

12. The bowed string instrument of claim 11, wherein the string grooves have a lateral groove space of approximately 5 millimeters.

13. The bowed string instrument of claim 1, wherein the heel is configured for allowing the thumb of the fingering hand to be positioned relatively closer to the body of the instrument, thereby assisting the fingering hand in reaching higher positions on the neck and fingerboard.

14. The bowed string instrument of claim 13, wherein:
- the heel has a heel length of approximately 10 millimeters; and
- the heel chamfer has a heel chamfer depth, as measured between the heel chamfer and the body, of approximately 20 millimeters.

15. The bowed string instrument of claim 1, wherein the heel is further configured for providing leverage for the thumb of the fingering hand to reach higher positions on the neck and fingerboard.

16. The bowed string instrument of claim 15, wherein the heel has a heel width of approximately 20 millimeters.

17. A bowed string instrument comprising:

a body providing a top plate on a top surface thereof;

an elongate neck extending from the top plate of the body, on which is supported an elongate fingerboard;

a proximal end of the neck connected to the body via a heel which provides a quarter-circular concave-shaped heel chamfer serving as a transition surface between the proximal end of the neck and the body;

an opposing distal end of the neck providing a pegbox supporting a plurality of tuning pegs configured for adjusting a tension of a plurality of strings, the strings extending from the tuning pegs, across a top surface of the fingerboard, over a bridge positioned on the top plate of the body, to a tailpiece also positioned on the top plate of the body;

the distal end of the neck further providing a nut positioned proximal to the pegbox and configured for guiding the strings into the pegbox;

a bottom surface of a proximal end of the pegbox providing an ergonomic, symmetrically tapered, lateral bulge configured for contacting and conforming to a purlicue of a fingering hand of a musician when the fingering hand is in a first position relative to the neck, so as to provide leverage for a thumb and a forefinger of the fingering hand to reach notes in lower and upper positions along the neck;

the bottom surface of the proximal end of the pegbox further providing a chin positioned a chin setback distance of approximately 4 millimeters toward a distal end of the pegbox, as measured from the nut, for assisting the fingering hand of the musician in reaching half positions on the fingerboard;

the bottom surface of the proximal end of the pegbox further providing a planar pegbox chamfer extending between the chin and a bottom surface of the neck as a transition surface therebetween, the pegbox chamfer having a pegbox chamfer length of approximately 20 millimeters and a pegbox chamfer angle of approximately 125 degrees relative to the bottom surface of the neck, for providing leverage for the thumb and forefinger of the fingering hand to reach positions along the neck and fingerboard by pressing and rotating against the pegbox chamfer, while also creating a physical stop for contacting the fingering hand when the fingering hand is in the first position relative to the neck;

a top surface of the pegbox having a pegbox width of approximately 25 millimeters; and the bottom surface of the proximal end of the pegbox, along with the chin, having a chin width of approximately 33 millimeters.

18. A bowed string instrument comprising:

a body providing a top plate on a top surface thereof;

an elongate neck extending from the top plate of the body, on which is supported an elongate fingerboard;

a proximal end of the neck connected to the body via a heel which provides a quarter-circular concave-shaped heel chamfer serving as a transition surface between the proximal end of the neck and the body;

an opposing distal end of the neck providing a pegbox supporting a plurality of tuning pegs configured for adjusting a tension of a plurality of strings, the strings extending from the tuning pegs, across a top surface of the fingerboard, over a bridge positioned on the top plate of the body, to a tailpiece also positioned on the top plate of the body;

the distal end of the neck further providing a nut positioned proximal to the pegbox and configured for guiding the strings into the pegbox;

an ergonomic, symmetrically tapered, lateral bulge engageable with a bottom surface of a proximal end of the pegbox and configured for contacting and conforming to a purlicue of a fingering hand of a musician when the fingering hand is in a first position relative to the neck, so as to provide leverage for a thumb and a forefinger of the fingering hand to reach notes in lower and upper positions along the neck;

the ergonomic, symmetrically tapered, lateral bulge further providing a chin positioned a chin setback distance of approximately 4 millimeters toward a distal end of the pegbox, as measured from the nut, for assisting the fingering hand of the musician in reaching half positions on the fingerboard;

the ergonomic, symmetrically tapered, lateral bulge further providing a planar pegbox chamfer extending between the chin and a bottom surface of the neck as a transition surface therebetween, the pegbox chamfer having a pegbox chamfer length of approximately 20 millimeters and a pegbox chamfer angle of approximately 125 degrees relative to the bottom surface of the neck, for providing leverage for the thumb and forefinger of the fingering hand to reach positions along the neck and fingerboard by pressing and rotating against the pegbox chamfer, while also creating a physical stop for contacting the fingering hand when the fingering hand is in the first position relative to the neck;

a top surface of the pegbox having a pegbox width of approximately 25 millimeters; and the ergonomic, symmetrically tapered, lateral bulge, along with the chin, having a chin width of approximately 33 millimeters.

* * * * *